United States Patent [19]

McDonald et al.

[11] Patent Number: 5,392,829

[45] Date of Patent: Feb. 28, 1995

[54] APPARATUS AND METHOD FOR LOADING OF LOGS

[75] Inventors: Ritchie P. McDonald, Port Moody, Canada; Douglas C. Beer, Bellingham, Wash.

[73] Assignee: CAE Machinery, Ltd., Vancouver, Canada

[21] Appl. No.: 206,056

[22] Filed: Mar. 3, 1994

[51] Int. Cl.$^6$ .................. B27B 1/00; B27C 1/12
[52] U.S. Cl. ...................... 144/356; 144/162 R; 144/242 R; 144/245 C; 198/550.2; 414/913
[58] Field of Search ............ 144/162 R, 1.76, 242 R, 144/242 E, 245 R, 245 C, 356, 357; 414/900, 923; 198/550.2, 429, 524; 53/540, 541

[56] References Cited

U.S. PATENT DOCUMENTS

| | | |
|---|---|---|
| 1,838,780 | 12/1931 | Miller et al. |
| 3,190,325 | 6/1965 | Mood . |
| 3,638,792 | 2/1972 | Bilocq . |
| 3,669,464 | 6/1972 | Linzmeier ............ 414/923 |
| 4,439,098 | 3/1984 | Rienks ................. 414/923 |
| 4,784,198 | 11/1988 | Pallmann . |
| 4,865,094 | 9/1989 | Stroud et al. |
| 5,070,918 | 12/1991 | Pallmann . |
| 5,127,212 | 7/1992 | Johnsen et al. |

*Primary Examiner*—W. Donald Bray
*Attorney, Agent, or Firm*—Kolisch, Hartwell, Dickinson, McCormack & Heuser

[57] ABSTRACT

An apparatus and method for aligning objects, particularly logs, into a loading region are provided. The apparatus comprises a stationary first side wall and a second side wall having a section that is movable with respect to the first wall. A lower floor section is provided between the two side walls. The side walls and the lower floor co-operate to define a loading region having an inlet and an outlet. The loading region is expandable from an initial minimum width sufficiently narrow to prevent misalignment of logs introduced through the inlet to a maximum width. Movement of the second movable side wall expands the loading region to create a gap between one side wall and aligned logs arranged against the other side wall. The gap is sufficiently narrow to prevent misalignment of logs introduced into the gap to ensure an aligned and ordered stack of logs within the loading region.

27 Claims, 3 Drawing Sheets

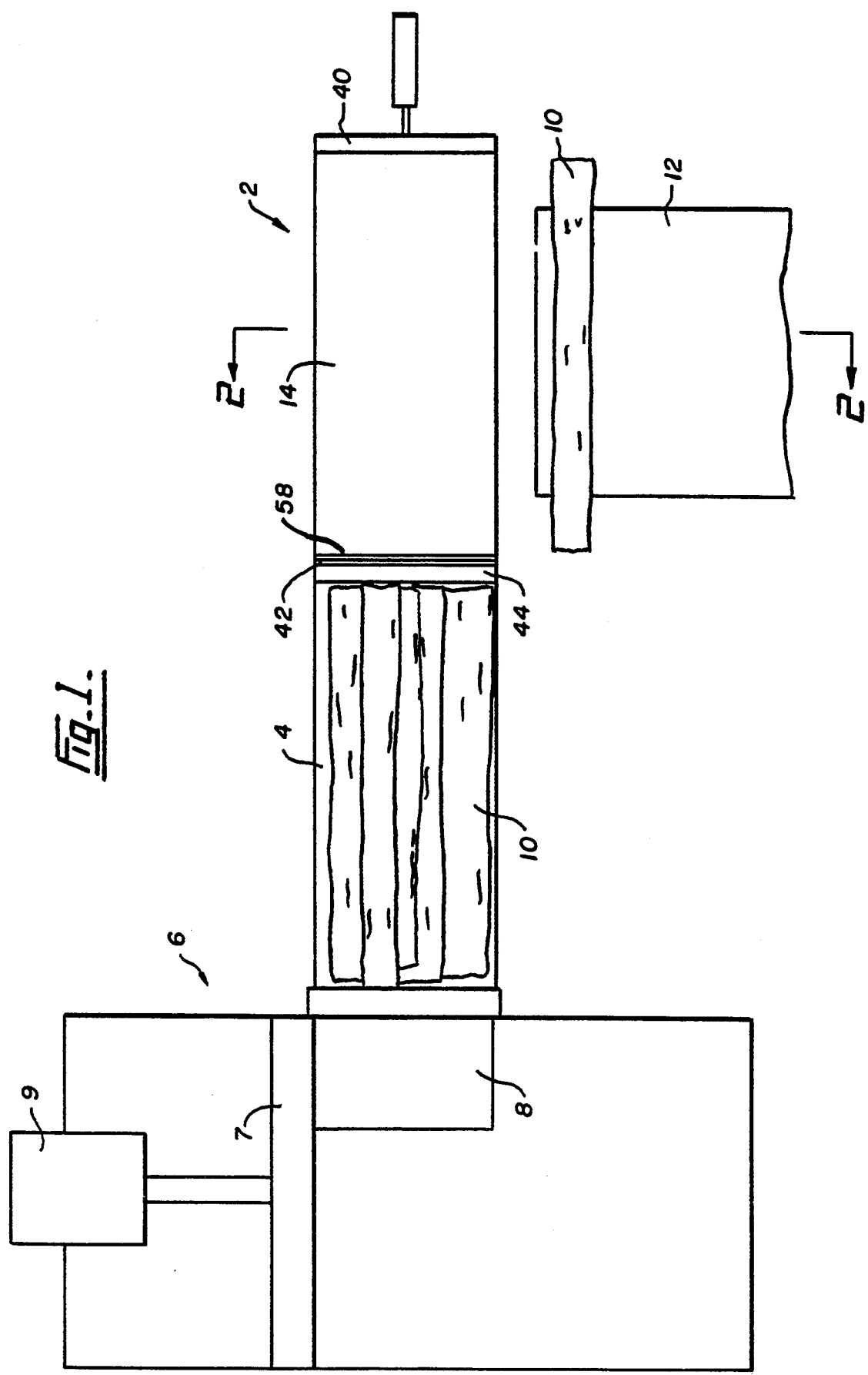

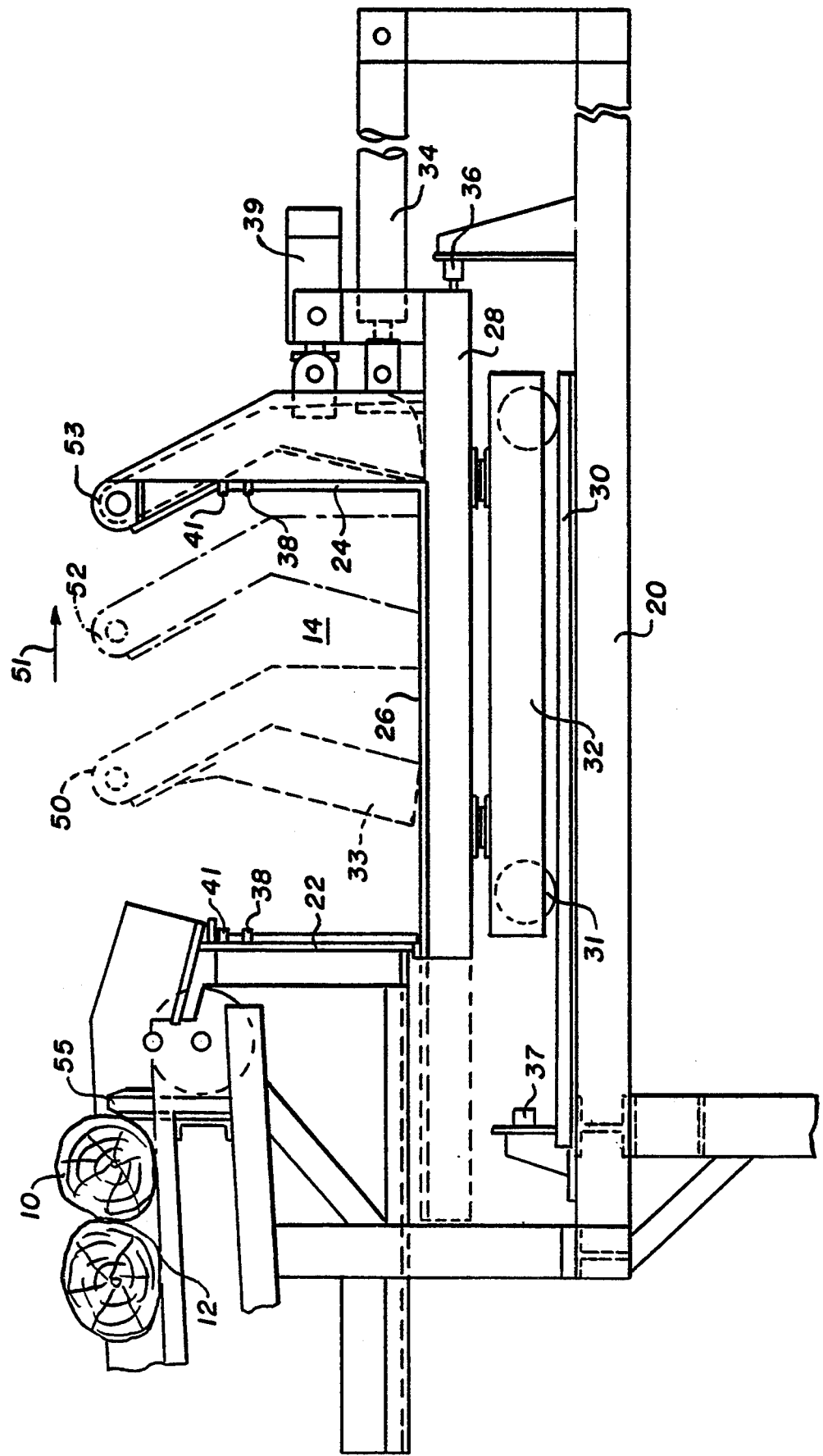

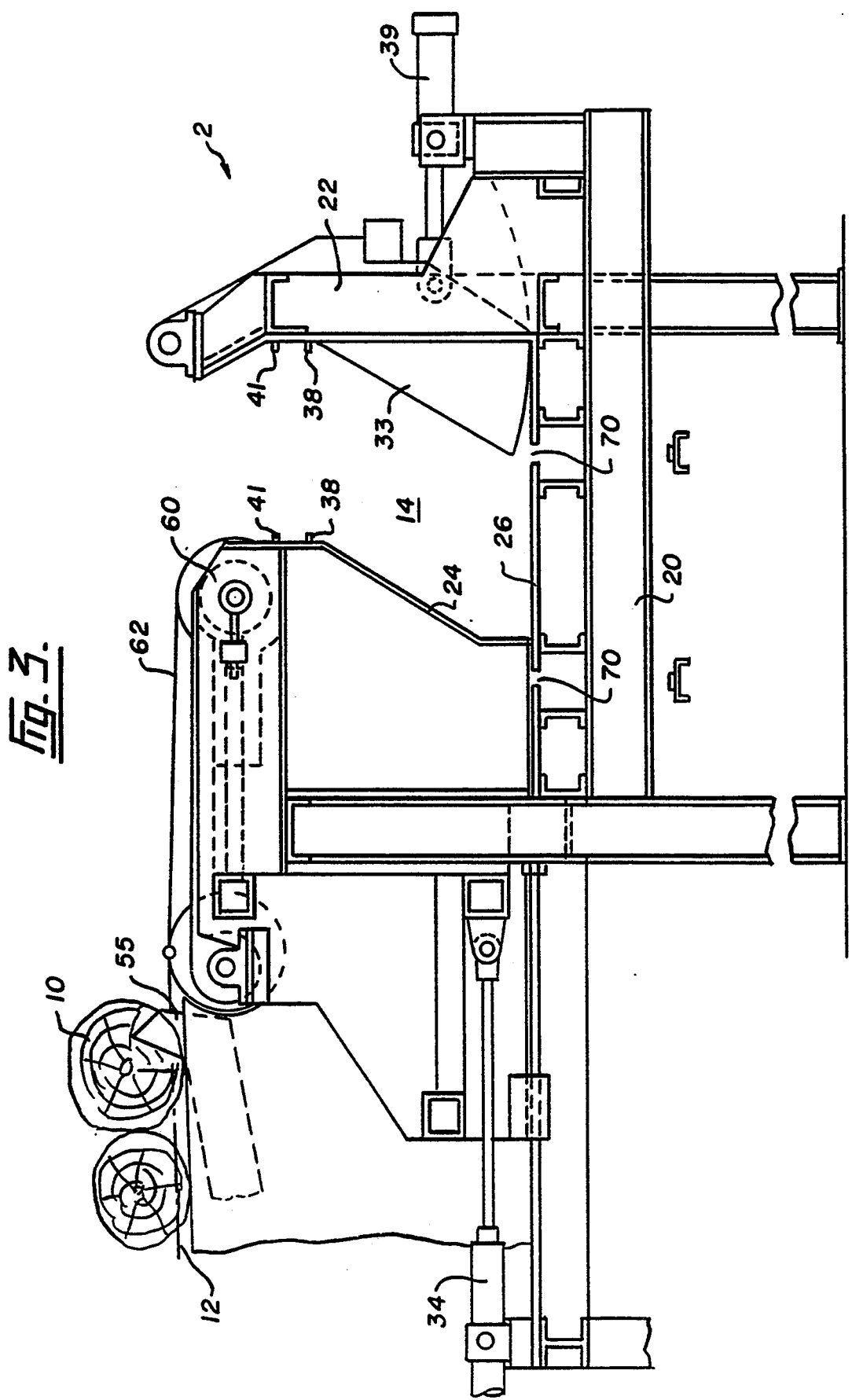

APPARATUS AND METHOD FOR LOADING OF LOGS

FIELD OF THE INVENTION

This invention relates to an apparatus and method for loading elongate objects such as logs into a loading region in organized, aligned piles.

BACKGROUND OF THE INVENTION

Large scale equipment for the automatic processing of logs is well known in the forestry industry. Equipment such as waferizers, flakers, chippers and stranders are used to convert raw logs into wafers, flakes, chips and strands, respectively, for use in particle and strand boards and like products. An example of such large scale processing equipment is disclosed in applicant's U.S. Pat. No. 4,865,094 issued Sep. 12, 1989 for a Long Log Waferizer. Such large scale equipment is capable of processing large quantities of logs in a very short time. In order to keep this equipment fed with a steady supply of raw logs, a log feeding system that can handle large quantities of logs quickly and efficiently is required. It is important that the feeding system be capable of stacking and organizing logs into neat and compact batches for conversion by the processing equipment. If the logs are not organized correctly, jamming of the feeding system and the processing equipment is possible, leading to damage and wasted time while the machinery is being unjammed or repaired.

For example, when processing logs into flakes, it is important that the wood grain of the flake is parallel with the length of the flake, and therefore, the logs need to be aligned parallel with the cutting blades of the flaking equipment. Typically, the cutting blades are arranged to be parallel with the side walls of a feeding chute by which batches of logs are delivered to the flaker. The logs are fed into the chute at a loading region remote from the flaking equipment to lie aligned with the longitudinal axis of the chute. The logs are then moved longitudinally down the chute toward the flaking equipment to be processed. Most current log feeding system operate in two steps such that as one batch of logs is being loaded into the loading region, another batch of previously organized logs is being fed along the chute into the flaking equipment. As might be expected, when logs are fed into the loading area, there is the possibility that certain logs, particularly shorter logs, will lie diagonally across the chute. This reduces the quality of the flakes produced by the flaker as these misaligned logs are not parallel with the cutting blades. In addition, it is important that the logs are kept parallel between the chute walls as this allows the chute to be filled efficiently with the maximum amount of wood per unit volume of the chute. The flaker production capacity is reduced when misaligned logs are present, as the packing of the logs in the chute is also reduced.

In the past, the practice has been to keep the log feed chutes relatively narrow in an attempt to prevent log misalignment as the logs are delivered to the log loading region of the chute. A log length to chute width ratio of approximately 2:1 alleviates some misalignment problems.

There is still the desire to further increase log processing capacity and better align the logs for improved quality of the processed product. A number of systems have been developed that attempt to address the foregoing problems:

U.S. Pat. No. 5,070,918 discloses a feed device that uses a chute with fixed, parallel side walls to receive logs. Pivoting guides are extendable into the chute to exert limited control over settling of the logs, however, this design relies principally on a relatively narrow chute to control misalignment of logs.

U.S. Pat. No. 4,784,198 discloses a log loading apparatus that uses a V-shaped trough to store and release logs into a chipping chamber and relies on gravity and the sloped sides of the trough to organize the logs into compact batches. This arrangement requires an installation that has a great deal of overhead clearance to accommodate the V-shaped trough over the chipping chamber. The chipping chamber must be reinforced to withstand the impact of a batch of logs dropped all at once from above and there is no provision for correcting alignment of the logs once they have been dropped into the chipping chamber.

U.S. Pat. No. 3,638,792 includes a log feeding system that uses a log aligning device. The system uses a stationary wall and a sloped chain conveyor that includes a series of rolls formed with a spiral ridge. As the logs move up the chain conveyor, the spiral ridge engages the logs and moves them against the stationary wall which acts as a reference line for aligning logs. This system is intended exclusively for aligning logs and does not address the issue of compactly loading the logs into a delivery chute.

SUMMARY OF THE INVENTION

The apparatus and method of the present invention provide a log loading system that the capacity of the log loading chute and improves the alignment of logs within the chute. By starting with a narrow chute, filling it, and then increasing the width continuously or in stages to load in more logs, the system of the present invention is able to maintain log alignment regardless of the final chute width.

Accordingly, the present invention provides apparatus for aligning elongate objects comprising:

a stationary first side wall;

a second side wall that is movable with respect to the first side wall; and means defining a lower surface between the two side walls, the side walls and the means defining a lower surface co-operating to define a loading region having an upper inlet and an outlet, the loading region being expandable from an initial minimum width sufficiently narrow to prevent misalignment of objects introduced through the inlet to a maximum width, movement of the second movable wall expanding the loading region to create a gap between one side wall and aligned objects arranged against the other side wall, the gap being sufficiently narrow to prevent misalignment of objects introduced into the gap to ensure an aligned and ordered stack of objects within the loading region.

In a second aspect the present invention provides a method for loading logs into a loading region comprising the steps:

providing a loading region defined by first and second opposed side walls and a lower floor;

delivering objects into the loading region;

increasing the width of the loading region from an initial minimum width sufficiently narrow to prevent misalignment of the elongate objects to a final maximum width while delivering logs to the loading region, the width of the loading region being increased at a rate to create a gap between one side wall and aligned objects suppported by the other side wall, the gap being sufficiently narrow to prevent misalignment of objects introduced into the gap to ensure an aligned and ordered stack of objects within the loading region.

In a third aspect, the present invention provides a method for loading logs into a loading region comprising the steps:

a) providing an object loading region defined by first and second opposed side walls, and a lower floor, the walls being separated by a gap sufficiently narrow to ensure alignment of objects delivered to the loading region;

b) delivering objects into the loading region until the gap is filled by a batch of objects;

c) increasing the width of the loading region to create a gap between the batch of objects and a side wall of the loading region that is sufficiently narrow to ensure alignment of the newly delivered objects; and d) repeating steps b) and c) until the loading region reaches a maximum width.

BRIEF DESCRIPTION OF THE DRAWINGS

Aspects of the present invention are illustrated, merely by way of example, in the accompanying drawings, in which:

FIG. 1 is a plan view showing the general arrangement of the log loading apparatus of the present invention with respect to a feed chute for log processing equipment;

FIG. 2 is a cross-sectional view taken along line 2—2 of FIG. 1 of a first embodiment of the present invention in which the side wall adjacent an infeed log conveyor is stationary; and FIG. 3 is a cross-sectional view taken along line 2—2 of FIG. 1 of a second embodiment of the invention in which the side wall opposite the infeed log conveyor is stationary.

DESCRIPTION OF THE PREFERRED EMBODIMENTS

Referring to FIG. 1, there is shown a plan view of a log loading apparatus 2 according to the present invention. Apparatus 2 is intended to be positioned adjacent the end of a feed conveyor 4 that delivers logs to the processing chamber 8 of a log processing machine 6. A disc flaker 7 with drive motor 9 is illustrated in FIG. 1, but it will be understood that any form of log processing equipment can be used with the apparatus of the present invention. In particular, the apparatus of the present invention can be used to supply logs to ring or drum cutters that cut on the inside or outside of the ring or drum. Apparatus 2 is aligned with the longitudinal axis of feed conveyor 4. In FIG. 1, log loading apparatus 2 is illustrated schematically and either of the embodiments illustrated in FIGS. 2 and 3 can be used with the general arrangement shown in FIG. 1.

The apparatus 2 of the present invention is used to load logs 10 into feed chute 4 for delivery to log processing equipment 6. The apparatus of the present invention is intended to receive logs 10 from a log conveyor 12 and retain the logs in an organized pile in which all logs are aligned with the longitudinal axis of feed chute 4. In effect, apparatus 2 of the present invention provides a loading region 14 for log processing equipment 6 that establishes an aligned group of logs for delivery to feed chute 4.

Referring to FIG. 2, there is shown a cross-section through a first embodiment of the apparatus 2 of the present invention taken along line 2—2 of FIG. 1. A framework 20 supports the apparatus which comprises essentially a stationary first side wall 22, a second side wall 24 that is movable with respect to the first side wall and a lower floor surface 26 between the two side walls. Side walls 22 and 24 and floor surface 26 co-operate to define a expandable loading region 14 having an open top. The open top is an inlet that accepts logs delivered by log conveyor 12 adjacent stationary first side wall 22. Log conveyor 12 is positioned transversely to the longitudinal axis of loading region 14 so that logs 10, when delivered to the loading region, are generally aligned with the longitudinal axis. As the logs are dropped off the end of conveyor 12 into loading region 14 to collide and rebound from floor 26 or other logs, it is possible that the logs will become misaligned. The apparatus of the present invention is intended to minimize this problem and organize the logs delivered in the loading region into a pile of neatly stacked, substantially parallel logs.

Stationary first side wall 22 is rigidly mounted to framework 20. Movable second side wall 24 is rigidly attached to lower surface 26 of the loading region to define a cart 28 that is movable with respect to first stationary side wall 22. Cart 28 is provided with a set or rollers 31 mounted within an undercarriage 32 that engage with a set of tracks 30 mounted below cart 28. Actuating means in the form of a hydraulic cylinder 34 connected between the outer surface of movable side wall 24 and framework 20 is provided to move cart 28 along tracks 30. Stationary side wall 22 is dimensioned to permit lower surface 26 of the cart to pass under the side wall with minimal clearance so that as cart is moved on track 30 the width of loading region 14 can be varied as illustrated by dotted lines in FIG. 2. A limit switch 36 is also provided to indicate when undercarriage 32 is at the outer limit of its travel and loading region 14 is at its broadest width. At the opposite end, a shock absorber 37 is provided to limit the movement of cart 28 toward stationary wall 22.

Loading region 14 is preferably provided with log settling means comprising one or more pivotable wedge plates 33 movable into loading region 14 through slots the side walls. In FIG. 2, the wedge plates are mounted into slots in movable side wall 24. Pneumatic or hydraulic cylinder 39 is used to control the position of wedge plates 33 which can be completely withdrawn from the loading region.

Sensor means comprising a plurality of paired photodetectors 38 are provided along the top edge of each side wall to detect whenever loading region 14 is filled with logs at a particular relative position of the side walls. If a photobeam extending between a pair of photodetectors 38 is broken for a minimum time period (approximately 1 second) to indicate that loading region 14 is filled, hydraulic cylinder 34 can be activated to move cart 28 to widen the loading region. Cylinder 34 is activated after a time delay to ensure that logs falling through the beam and into the loading region are ignored. Alternatively, as best shown in FIG. 1, if the loading region is already at its maximum width and photodetectors 38 indicate that loading region 14 is filled, pushing means in the form of a hydraulically actuated pushing plate 40 can be activated to push the full load of logs through outlet 42 of loading region 14 into feed chute 4 for further handling. Outlet 42 of the loading region is positioned adjacent feed chute 4 and the loading region and the feed chute are arranged along a single longitudinal axis. A second pushing member 44 can be positioned behind the logs in the feed chute to complete delivery of the logs to the processing chamber 8 of the processing equipment 6. Pushing member 44 is retracted out of feed chute 4 when pushing plate 40 is moving logs from the loading region into the start of the feed chute. In an alternative arrangement, pusher 40 can be used to move piled logs directly into the processing chamber 8 of the processing equipment and retracted whereupon pushing member 44 can be used to further handle the logs. By employing separate pushing plates in the loading region and the feed chute it is possible to load a batch of logs in the loading region at the same time that a previous batch of logs is being processed by the processing equipment.

In addition, over height photodetectors 41 can be positioned above photodetectors 38 to indicate when the loading region 14 has been overfilled which could result in jamming of the log processing equipment. If an over-height condition is detected, the loading apparatus will shutdown and manual removal or repositioning of any excess logs is necessary before reactivation of normal operation.

There are a number of ways in which the apparatus of the present invention can be operated with respect to movement of the movable wall. An example of an operation cycle for the apparatus is as follows:

Initially, before loading of a batch of logs, the width of the loading region is reduced by activating hydraulic cylinder 34 to move cart 28 and hence movable side wall 24 toward stationary side wall 22. Shock absorber 37 stops cart at position 50 indicated by dashed lines in FIG. 2. Cylinder 39 is activated to extend wedge members 33 into the loading region. Conveyor 12 is then activated to deliver logs 10 through the top inlet into loading region 14 via conveyor 12. The reduced width of loading region 14 ensures that logs dropped into the loading region are kept aligned between side walls 22 and 24. When loading region 14 is filled for a first time, the photobeam between detectors 38 will be broken for a minimum time which will signal cylinder 39 to withdraw wedge member 33, causing the log pile to collapse and settle, thus clearing the photobeam and establishing an initial pile of aligned and stacked logs. The wedge elements may be cycled quickly to help align and settle the pile.

As more logs continue to be delivered by conveyor 12, a fill condition will be reached a second time. At this point, hydraulic cylinder 34 is activated to begin slowly moving cart 28 away from stationary side wall 22 to increase the width of the loading region as indicated by arrow 51. The previously loaded logs will tend to retain their stacked form adjacent movable wall 24. As logs continue to be delivered to the loading region by conveyor 12, the new logs will tend to fall into the expanding gap created between the already stacked logs supported by wall 24 and stationary wall 22. Therefore, any newly introduced logs fall into a relatively narrow gap that ensures alignment of the logs is maintained once the initial pile of logs against movable wall 24 is established.

Moveable side wall 24 is stopped at an intermediate stop position 52, indicated by dashed lines in FIG. 2, to establish a loading region width that is intermediate the minimum and maximum dimensions of the region. The loading region is permitted to fill up again as detected by photodetectors 38. When this third fill condition is detected, side wall 24 is gradually moved back to its maximum width stop position at 53, thereby activating switch 36, and aligned stacking of logs continues in the same manner as before. Once side wall 24 reaches position 53, logs continue to be delivered to the loading region until a fourth and final fill condition is detected. At this point, log conveyor 12 is stopped and log stop means 55 associated with log conveyor 12 is activated to prevent any further logs from falling into the loading region. Wedge members 33 are cycled once or twice to assist in final settling of the log pile in the loading region. If the log pile is blocking the over height detectors 41, the wedge members can be cycled two more times in an attempt to further settle the log pile. If the over height condition remains, an alarm should be sounded to alert the operator to manually correct the condition. If the bundle is not over-height and switch 36 has been activated to indicate that the loading region is open to its maximum extent, pushing plate 40 is activated to push the completed log pile out of the loading region and into feed chute 4 through loading region outlet 42 as best shown in FIG. 1 and then plate 40 is retracted. Movable wall 24 is advanced to re-establish loading region 14 at its minimum width. The entire log loading process is then repeated.

In the foregoing description of the general cycle of the apparatus, movable side wall 24 is moved continuously but gradually between the minimum, intermediate and maximum width stop points. The speed of movement is calculated so that the expanding gap is always able to accept any logs delivered by conveyor 12. There is no limit to the number of stop points that can be used and, in fact, the movement of the movable wall can be continuous between the initial width and the maximum width stop points without any intermediate stop positions.

Preferably, there is a log gate 58 at loading region outlet 42 that can be lowered into chute 4 to seal the outlet when logs are being loaded.

Referring to FIG. 3, there is shown a second embodiment of the loading region apparatus in which parts similar to the first embodiment are identically labelled.

In the embodiment of FIG. 3, stationary side wall 22 is positioned opposite conveyor 12 and movable side wall 24 is positioned adjacent the conveyor. Wedge element 33 is mounted in slots in stationary wall 22 opposite conveyor 12. Side wall 24 is slidable supported on framework 20 and is moved by hydraulic cylinder 34. Side wall 24 is shown positioned so that loading region 14 is of minimum width. Note also that floor 26 is formed with a pair of channels 70 to accommodate a chain drive system (not shown) for moving pushing plate 40 as opposed to the hydraulic actuating system shown in FIG. 1.

In order for logs 10 to reach the loading region from conveyor 12 with the apparatus of FIG. 3, the logs must be transported over the top surface 60 of movable side wall 24. An auxiliary conveyor 62 is mounted to surface 60 to receive logs 10 from log conveyor 12 and transport the logs over the movable side wall and into the loading region via the loading region inlet. Auxiliary conveyor 62 is adapted to telescope between the paired conveyor chains of log conveyor 12 as the position of movable side wall 24 is varied. Conveyor 62 runs at a slightly faster speed than conveyor 12. Otherwise, the general operation and structure of the embodiment of FIG. 3 is similar to the embodiment shown in FIG. 2. In the present embodiment, however, logs are stacked against stationary side wall 22 and the expandable gap is created between stacked logs and retreating moving side wall 24. This is opposite to the arrangement of the embodiment of FIG. 2 in which stacked logs are supported by moving wall 24 and the expandable gap is created between the logs and stationary side wall 22. This situation results due to the fact that in the embodiment of FIG. 2, floor 26 moves with side wall 24.

In addition to forming neatly stacked piles of aligned logs, the apparatus of the present invention also overcomes the width limitations of previous feed chutes where, as a general rule, the log length to chute width ratio was 2:1 to prevent misalignment of logs dropped into the chute. The apparatus of the present invention does not suffer from this limitation and the movable side wall feature of the present invention permits a chute of any desired width to be used thereby increasing the number and volume of logs that can be stacked and processed in a single pile.

In the embodiments of the present application, the apparatus has been described with respect to handling of logs. It will be understood that the apparatus and method of the present application can be applied when stacking of any elongate objects is required. Therefore, the apparatus and method of the present invention can be used to handle other objects such as pipes and the like.

Although the present invention has been described in some detail by way of example for purposes of clarity and understanding, it will be apparent that certain changes and modifications may be practised within the scope of the appended claims.

We claim:

1. Apparatus for aligning elongate objects comprising:
   a stationary first side wall;
   a second side wall that is movable with respect to the first side wall; and
   means defining a lower surface between the two side walls, the side walls and the means defining a lower surface co-operating to define a loading region having an upper inlet and an outlet, the loading region being expandable from an initial minimum width sufficiently narrow to prevent misalignment of objects introduced through the inlet to a maximum width, movement of the second movable wall expanding the loading region to create a gap between one side wall and aligned objects arranged against the other side wall, the gap being sufficiently narrow to prevent misalignment of objects introduced into the gap to ensure an aligned and ordered stack of objects within the loading region.

2. Apparatus as claimed in claim 1 in which the elongate objects are logs and the outlet of the loading region is positioned adjacent to a feed chute for delivering logs to log processing equipment, the loading region and the feed chute being arranged along a single longitudinal axis.

3. Apparatus as claimed in claim 1 in which the inlet of the loading region is the open top of the space between the two walls.

4. Apparatus as claimed in claim 3 in which elongate objects are delivered to the inlet of the loading region by a conveyor arranged transversely to the longitudinal axis of the loading region.

5. Apparatus as claimed in claim 4 in which the stationary first side wall is positioned adjacent the conveyor.

6. Apparatus as claimed in claim 5 in which the movable second side wall is fixed with respect to the lower surface of the loading region to define cart means movable with respect to the first stationary side wall.

7. Apparatus as claimed in claim 6 including:
   track means mounted below the cart means;
   rolling means attached to the cart means to engage the track means and movably support the cart means thereon; and
   actuating means adapted to move the cart means on the track means in order to vary the width of the loading region.

8. Apparatus as claimed in claim 4 in which the first stationary side wall is positioned opposite the conveyor.

9. Apparatus as claimed in claim 8 in which the movable second side wall is positioned adjacent the conveyor and includes an auxiliary conveyor to receive elongate objects from the log conveyor and transport the objects over the movable side wall and into the loading region via the loading region inlet as the position of the movable side wall is varied within the loading region.

10. Apparatus as claimed in claim 9 in which the auxiliary conveyor is mounted atop the movable second side wall and is dimensioned to telescope with respect to the conveyor as the position of the movable side wall is varied.

11. Apparatus as claimed in claim 1 including sensor means to detect when the loading region is filled with objects.

12. Apparatus as claimed in claim 4 including elongate object stop means associated with the conveyor to prevent objects from moving from the conveyor into the loading region once the loading region is filled.

13. Apparatus as claimed in claim 1 including pushing means to move a batch of objects through the outlet of the loading region into the feed chute.

14. Apparatus as claimed in claim 1 including object settling means movable into the loading region through the side walls.

15. Apparatus as claimed in claim 14 in which the object settling means comprises a plurality of wedge members pivotable into the loading region through slots in the side walls.

16. A method for organizing elongate objects comprising the steps:
   providing a loading region defined by first and second opposed side walls and a lower floor;
   delivering objects into the loading region;
   increasing the width of the loading region from an initial minimum width sufficiently narrow to prevent misalignment of the elongate objects to a final maximum width while delivering logs to the loading region, the width of the loading region being increased at a rate to create a gap between one side wall and aligned objects suppported by the other side wall, the gap being sufficiently narrow to prevent misalignment of objects introduced into the gap to ensure an aligned and ordered stack of objects within the loading region.

17. A method as claimed in claim 16 in which the width of the loading region is increased by moving one of the side walls with respect to the another stationary side wall.

18. A method as claimed in claim 16 in which elongate objects are delivered to the loading region by a conveyor.

19. A method as claimed in claim 16 including the additional step of pushing the objects from loading region when the loading region is filled to maximum capacity.

20. A method as claimed in claim 16 in which the width of the loading region is varied between pre-determined stop points from the initial minimum width to the final maximum width.

21. A method as claimed in claim 20 in which the pre-determined stop points include an intermediate stop point between the minimum and maximum widths.

22. A method as claimed in claim 20 in which the loading region at a pre-determined stop point is filled before the width of the loading region is increased to the next stop point.

23. A method as claimed in claim 16 in which the width of the loading region is continuously increased from the initial minimum width to the final maximum width.

24. A method for organizing elongate objects comprising the steps:
   a) providing an object loading region defined by first and second opposed side walls, and a lower floor, the walls being separated by a gap sufficiently narrow to ensure alignment of objects delivered to the loading region;
   b) delivering objects into the loading region until the gap is filled by a batch of objects;
   c) increasing the width of the loading region to create a gap between the batch of objects and a side wall of the loading region that is sufficiently narrow to ensure alignment of the newly delivered objects; and
   d) repeating steps b) and c) until the loading region reaches a maximum width.

25. A method as claimed in claim 24 in which the width of the loading region is varied between pre-determined stop points from an initial minimum width to a final maximum width.

26. A method as claimed in claim 25 in which the pre-determined stop points include an intermediate width.

27. A method as claimed in claim 24 including the additional step of pushing the logs from loading region when the loading region is filled to maximum capacity.

* * * * *